(12) United States Patent
Singh et al.

(10) Patent No.: US 11,176,403 B1
(45) Date of Patent: Nov. 16, 2021

(54) FILTERING DETECTED OBJECTS FROM AN OBJECT RECOGNITION INDEX ACCORDING TO EXTRACTED FEATURES

(71) Applicant: Amazon Technologies, Inc., Seattle, WA (US)

(72) Inventors: Kunwar Yashraj Singh, Bellevue, WA (US); Keith Young Johnson, Seattle, WA (US); Vivek Bhadauria, Redmond, WA (US); Sean R. Flynn, Boise, ID (US); Binglei Du, Seattle, WA (US); Dylan C. Thomas, Redmond, WA (US); Vasant Manohar, Bothell, WA (US); Jonathan Hedley, Seattle, WA (US); Wei Xia, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 155 days.

(21) Appl. No.: 16/183,365

(22) Filed: Nov. 7, 2018

Related U.S. Application Data

(60) Provisional application No. 62/727,983, filed on Sep. 6, 2018.

(51) Int. Cl.
*G06K 9/00* (2006.01)
*G06K 9/46* (2006.01)
*G06K 9/62* (2006.01)

(52) U.S. Cl.
CPC ........... *G06K 9/46* (2013.01); *G06K 9/00221* (2013.01); *G06K 9/6262* (2013.01)

(58) Field of Classification Search
None
See application file for complete search history.

(56) References Cited

U.S. PATENT DOCUMENTS

| 9,639,740 B2 | 5/2017 | Ganong et al. |
| 2008/0082426 A1* | 4/2008 | Gokturk ............. G06Q 30/0623 705/26.62 |
| 2015/0286896 A1* | 10/2015 | Watanabe ........... G06F 16/5854 382/103 |

OTHER PUBLICATIONS

Dayong Wang, et al., "Face Search at Scale: 80 Million Gallery", MSU Technical Report, MUS-CS-15-11, Jul. 24, 2015, arXiv:1507.07242v2, pp. 1-14.
Ce Qi, et al., "Accurate and Efficient Similarity Search for Large Scale Face Recognition", arXiv:1806.00365v1, Jun. 1, 2018, pp. 1-7.
Dayong Wang, et al., "Face Search at Scale", IEEE Transactions on Pattern Analysis and Machine Intelligence, 2016, pp. 1-14.
Ankan Bansal, et al., "The Do's and Don'ts for CNN-base Face Verification", in ICCV Workshops, May 2017, pp. 2545-2554.
Gary B. Huang, et al., "Labeled Faces in the Wild: A Database for Studying Face Recognition in Unconstrained Environments", In Workshop on faces—Life'Images: detection, alignment, and recognition, pp. 1-15.

(Continued)

*Primary Examiner* — Wei Wen Yang
(74) *Attorney, Agent, or Firm* — Robert C. Kowert; Kowert, Hood, Munyon, Rankin & Goetzel, P.C.

(57) ABSTRACT

Objects detected in data may be filtered from an object recognition index. Data for object detection may be received. An object detection technique may be applied to the data to detect an object. If the object does not satisfy indexing criteria for the object recognition index, then the detected object may be excluded from the object recognition index.

20 Claims, 8 Drawing Sheets

(56) References Cited

OTHER PUBLICATIONS

Brendan F. Klare, et al., "Pushing the Frontiers of Unconstrained Face Detection and Recognition: IARPA Janus Benchmark A", In Proceedings of the IEEE conference on computer vision and pattern recognition, 2015, pp. 1931-1939.

Ira Kemelmacher-Shlizerman, et al., "The MegaFace Benchmark: 1 Million Faces for Recognition at Scale", In Proceedings of the IEEE Conference on Computer Vision and Pattern Recognition, 2016, pp. 4873-4882.

* cited by examiner

FILTERING DETECTED OBJECTS FROM AN OBJECT RECOGNITION INDEX ACCORDING TO EXTRACTED FEATURES

RELATED APPLICATIONS

This application claims benefit of priority to U.S. Provisional Application Ser. No. 62/727,983, entitled "FILTERING DETECTED OBJECTS FROM AN OBJECT RECOGNITION INDEX ACCORDING TO EXTRACTED FEATURES," filed Sep. 6, 2018, and which is incorporated herein by reference in its entirety.

BACKGROUND

Computer vision or other object recognition techniques offers computers many capabilities to performance various tasks that might otherwise be impossible for the computer to perform in different scenarios. Object recognition has, for instance, many different applications to facilitate diverse technologies and systems, including automated vehicle operation, assisted medical operations, or identity services to provide secure payment or other transactions. In order to facilitate object recognition, techniques may be implemented to manage and evaluate the large amount of image data that can be captured as part of object recognition. Techniques that improve the selection and evaluation of image data in such large scale settings are thus highly desirable.

Figure 1:
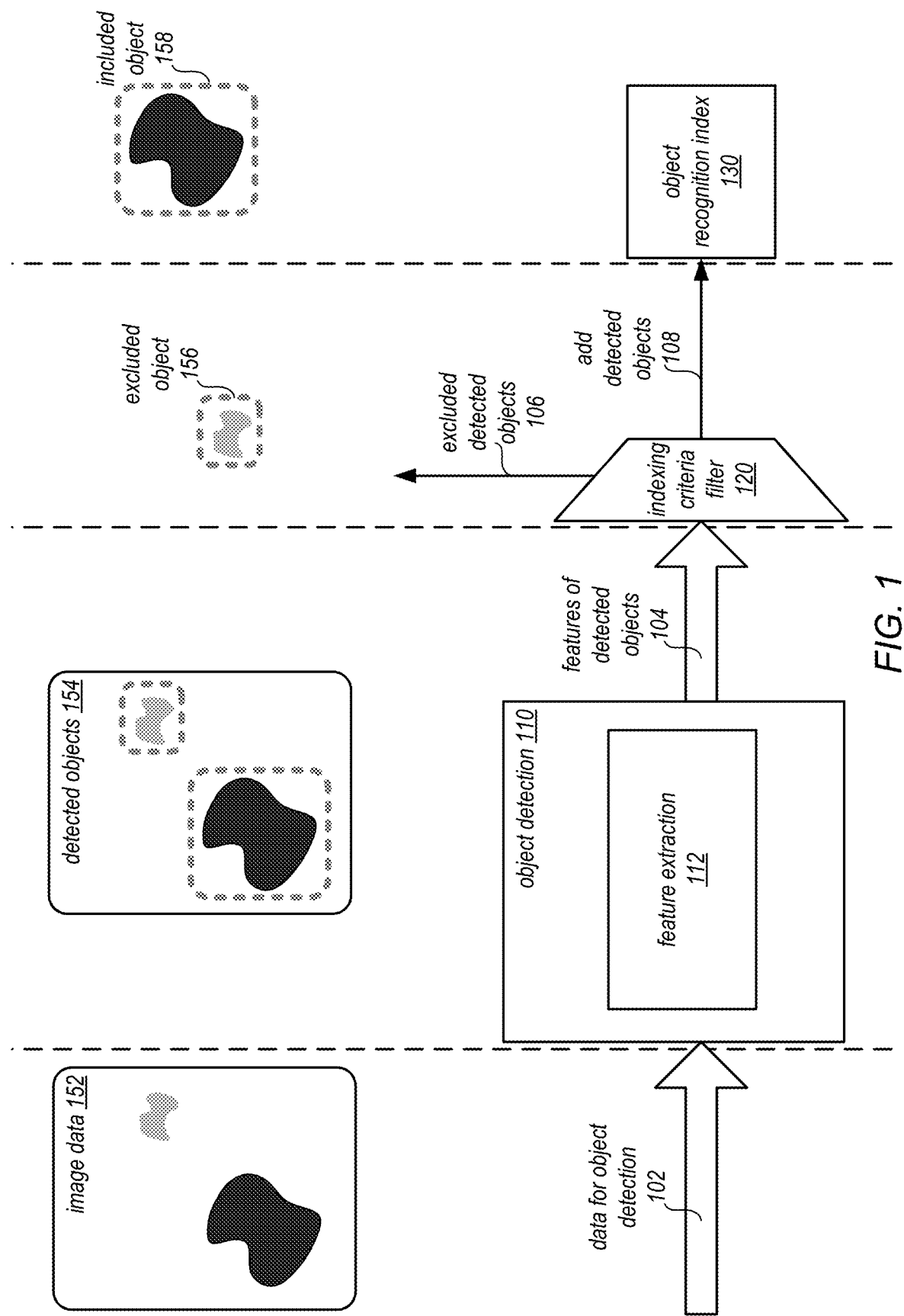
FIG. 1 illustrates a logical diagram of filtering detected objects from an object recognition index according to extracted features, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of filtering detected objects from an object recognition index according to extracted features are described herein. Object detection techniques, like those that utilize deep neural networks, have achieved state of the art performance in computer vision tasks such as object recognition (e.g., classifying image objects, recognizing human faces, detecting text in image data, comparing or identifying similar or matching objects, natural language processing, etc.). In various embodiments, the discriminative features extracted by these techniques (e.g., features extracted by deep neural networks and/or features determined as attributes based on these features) may allow systems to identify similar objects by extracting features of a query image and running a similarity search over a collection of stored feature vectors. The ability to search for similar objects over a large collection of stored object features may allow for multiple applications. For example, if the detected object is a human face and the searched objects are human faces, then systems can provide face recognition, face search, and person re-identification, in some embodiments.

The quality of features extracted by the object detection technique may determine the accuracy of the search, in some scenarios. If, for instance, the extracted features are not discriminative enough, a similarity search over objects stored in an index according to those features may degrade in performance or accuracy (e.g., resulting in increased false matches). The quality of features extracted by object detection technique may, in some embodiments, be impacted by false positive object detections (e.g., detecting non-face images as a face) and/or low-quality object detections (e.g., such as a blurry or out-of-focus faces detected in an image). This impact may be compounded over time as a collection of detected objects in an object recognition index increases in size because the presence of such false positive or low-quality object detections may increase as well, which could cause the search quality to decrease as searches may consider the false positive or low quality objects when making a search. For example, in a face recognition scenario, a sharp face in a query image might get matched to a low-quality blurry image of a different person or an object that is not actually a human face, which would reduce the accuracy of the face-search and make it difficult for a user to understand the result or for a system to accurately perform some function (e.g., face identification for security systems that allow users into a building).

In various embodiments, filtering detected objects for inclusion in an object recognition index may be performed to substantially reduce (or exclude entirely) low-quality or false positive object detections using features of the image data extracted when the objects were detected. Examples of such features may be general across many different types of objects that can be detected, such as brightness, sharpness, confidence, and bounding box in image data, or specific to a particular type of object being detected (e.g., face pose features for face detection or sentiment for natural language processing). Indexing criteria that includes combinations of one or more feature values (or range of feature values) that indicate which detected objects should be included (and which should be excluded) from an object recognition index, for instance may be applied to filter detected objects. In at least some embodiments, a weighted combination of the features may be used to filter detect objects.

In various embodiments, filtering detected objects for inclusion in an object recognition index may significantly increase object search or other analysis accuracy by rejecting low-quality objects and false positives objects, leading to an increase in precision and recall. Consider the face recognition example mentioned above. Filtering out non-face object or low quality faces detected in image data can avoid poor quality or incorrect face search results. Additionally, the growth rate of the size of the object recognition index may be slowed be proportional to the number of high-quality objects included in the index, in some embodiments.

Because filtering detected objects may be performed using the extracted features determined during the application of object detection techniques (instead of performing a separate analysis on the detected objects using different models or recognition techniques or generating different features for filtering) and can be applied after the object detection technique is performed, the computational costs of filtering as a post-processing step can be minimized. Filtering detected objects for inclusion in an object recognition index may reduce the amount of noise in the object recognition index on which the search is performed leading to a better top-k search accuracy on any size of image index, with accuracy gains becoming particular notable as number of objects included in the object recognition index becomes larger (e.g., more than a million objects), in some embodiments.

FIG. 1 illustrates a logical diagram of filtering detected objects from an object recognition index according to extracted features, according to some embodiments. As indicated at 102, data for object detection 102 may be received at an object detection component or pipeline 110 that applies an object detection technique that includes feature extraction 112. Image data 152, for example, may be received with no prior annotation or indication of the contents within image data 152. Data 102 may be received as part of a request to index (or otherwise include) a particular image file (or recognized objects therein) or character string submitted as part of a request, or may be obtained from a data store that includes a large number of images that may be evaluated to build or create an object recognition index.

Object detection 110 may perform operations to prepare data for object detection (e.g., crop, enhance, down-sample, normalize, or otherwise modify image data), in some embodiments. For example, gamma correction may be applied to enhance image data quality for face detection. Object detection 110 may implement one or more object detection techniques. For instance, a histogram of oriented gradients (HOG) determined for an image may be evaluated utilizing a trained support vector machine (SVM) to detect faces in an area of image data identified within a bounding box. Similarly, other object detection techniques may be applied.

For detected objects, feature extraction 112 may identify various features within data that correspond to detected objects as part of object detection 110. For example, feature extraction 112 may be implemented as part of a deep neural network (e.g., a convolutional neural network (CNN)) which may be trained to generate feature vectors which, when compared with other feature vectors generated using the same deep learning model to indicate similarity between objects according to the respective distance between the feature vectors, in some embodiments. Feature extraction 112 may encode or generate extracted features (e.g., as a feature vector), in various embodiments, which may be used to represent a detected object. In some embodiments, features may be extracted using an CNN or other neural network model, and domain-specific attributes may use the extracted features as intermediate features from which to extract the domain-specific attributes as additional features for object recognition. For example, a bounding box value detected for a recognized object in image data may be then be used to direct sharpness, brightness, or other image data specific attributes for the bounding box area which can be used as additional features (including as features for indexing criteria as discussed below).

In the illustrated example, object detection 110 may detect two objects 154, which may be surrounded by bounding boxes as detected in image data 152. Because object detection 110 may be tuned (or implemented separately) for detecting different types of objects (e.g., human faces, animals, inanimate objects, text, etc.), the previous examples are not intended to be limiting.

The features of detected objects 104 determined at object detection 110 may be filtered according to one or more indexing criteria at indexing criteria filter 120, in some embodiments. For example, if object detection 110 performs face detection, then the extracted features may include face pose features such as pitch, yaw, and roll. In such a scenario, indexing criteria filter 120 may apply one or more threshold tests for different ones of the extracted features, such as pitch of a face pose between −80° and 80°, a yaw of a face pose between −90° and 90°, or a roll of a face pose between −56° and 56.° In some embodiments, some extracted features may be common to many different types of detect objects. Brightness, sharpness, or confidence score for the output of the face detection, for example, may be such commonly extracted features. Thus, in some embodiments, indexing criteria filter 120 may evaluate extracted features for different types of detected objects with respect to a brightness greater than a minimum value, a sharpness greater than a minimum value, a confidence score for the output of the face detection greater than a minimum value, and/or various dimensions of a bounding box for the detected object.

In various embodiments, detected objects with features that do not satisfy the indexing criteria filter 120 may be excluded 106. Consider excluded object 156. Various feature values, such as brightness, bounding box size, or sharpness could have failed to exceed a minimum threshold value.

For detected objects that do satisfy the indexing filter criteria, the detected objects may be added 108 to object recognition index 130, in some embodiments. Object recognition index 130 may store representations (e.g., feature vectors, with features generated from a neural network and/or domain-specific attributes, or other information descriptive of the indexed objects) for search or other analysis, as discussed below with regard to FIG. 5. For example, a feature vector for included object 158 (which may have feature values, such as brightness, bounding box size, or sharpness that exceeded a minimum threshold value) could be stored in object recognition index 130.

Please note that the previous description of filtering detected objects from an object recognition index according to extracted features is a logical illustration and thus is not to be construed as limiting as to the implementation of an object recognition index, indexing criteria filter, object detection, or object data.

This specification begins with a general description of a provider network that implements multiple different services, including an object recognition service, which may perform filtering detected objects from an object recognition index according to extracted features. Then various examples of, including different components/modules, or arrangements of components/module that may be employed as part of implementing the object recognition service are discussed. A number of different methods and techniques to implement filtering detected objects from an object recognition index according to extracted features are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
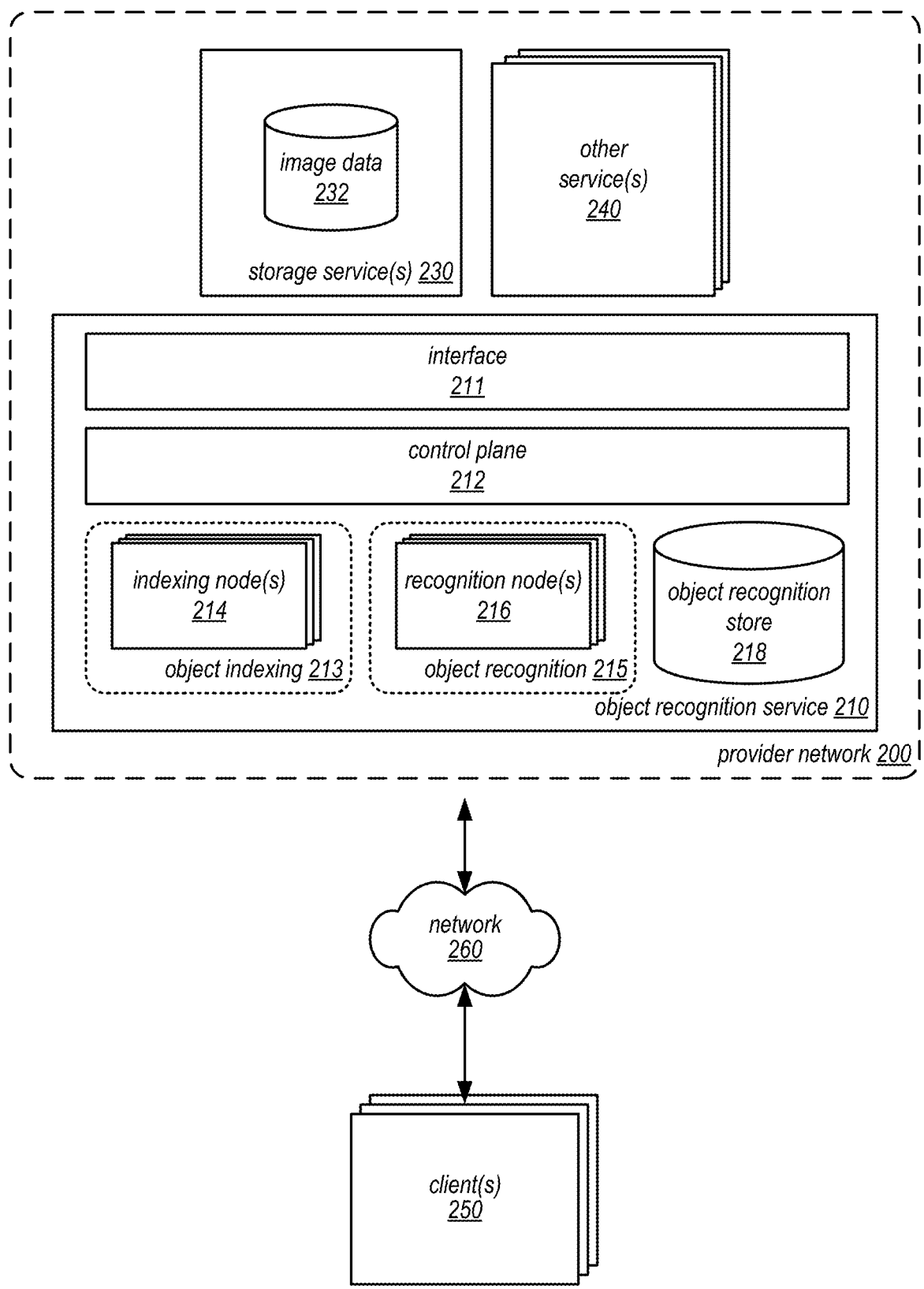
FIG. 2 illustrates an example provider network that may implement a service that implements an object recognition service that filters detected objects from an object recognition index according to extracted features, according to some embodiments.

FIG. 2 illustrates an example provider network that may implement a service that implements an object recognition service that filters detected objects from an object recognition index according to extracted features, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200, in one embodiment. In some embodiments, provider network 200 may implement various computing resources or services, such as object recognition service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of object recognition service(s) 210 may be implemented by a particular node or may be distributed across several nodes. In some embodiments, a given node may implement the functionality of more than one service system component (e.g., more than one data store component).

Object recognition service 210 may implement interface 211 to allow clients (e.g., client(s) 250 or clients implemented internally within provider network 200, such as a client application hosted on another provider network service like an event driven code execution service or virtual compute service) to index and analyze objects included in data, such as image data (which may be found in various types of media, such as still images or video data) or other data (e.g., text/character strings for natural language processing). For example, object recognition service 210 may implement interface 211 (e.g., a graphical user interface, as discussed below with regard to FIG. 4, programmatic interface that implements Application Program Interfaces (APIs) and/or a command line interface) may be implemented so that a client can request an object recognition index be created for image data 232 stored in storage service(s) 230, and/or image data in other storage locations within provider network 200 or external to provider network 200 (e.g., on premise data storage in private networks). Interface 211 may allow a client to request the performance of analysis (e.g., to search, compare, classify, or label image data content), as discussed in detail below.

Object recognition service 210 may implement a control plane 212 to perform various control operations to implement the features of object recognition service 210. For example, control plane may monitor the health and performance of requests at different components, such as indexing nodes 214 and/or recognition nodes 216. If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s) (e.g., indexing nodes 214 or recognition nodes 216), in various embodiments. For example, control plane 212 may receive requests interface 211 which may be a programmatic interface, and identify an available node to begin work on the request.

Object recognition service 210 may implement object indexing 213, as discussed in detail below with regard to FIG. 3. Indexing nodes(s) 214 may perform various stages, operations, or tasks of indexing, and/or may operate as individual pipelines or workflows to perform an entire indexing request (e.g., individually or as a cluster/group of nodes), in some embodiments.

Figure 5:
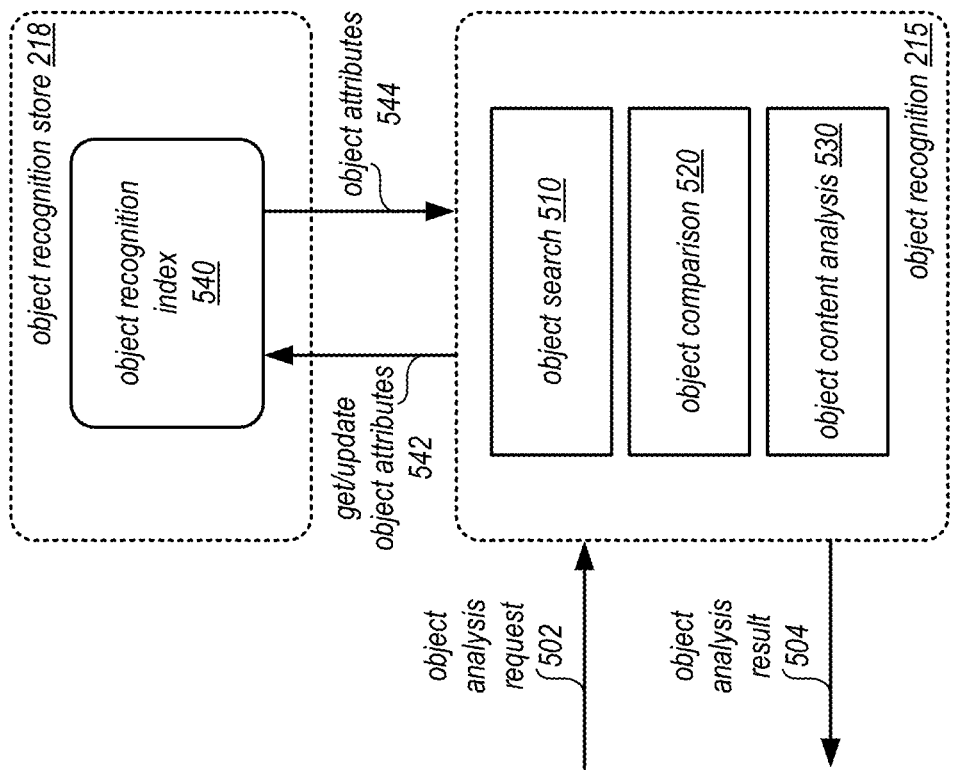
FIG. 5 illustrates a logical block diagram of object recognition using an object recognition index, according to some embodiments.

Object recognition service 210 may implement object recognition 215, as discussed in detail below with regard to FIG. 5. Recognition nodes(s) 216 may perform various stages, operations, or tasks of analyzing data utilizing an object recognition index, and/or may operate as individual pipelines or workflows to perform an entire matching request (e.g., individually or as a cluster/group of nodes), in some embodiments.

Object recognition store 218 may be one or more data storage systems or services (e.g., hosted by another provider network 200 service), that can store generated object recognition indexes and non-index object information to perform object indexing and recognition as discussed below with regard to FIGS. 3-5.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments, Data storage service(s) 230 may include object or file data stores for putting, updating, and getting data objects or files, in some embodiments. For example, one data storage service 230 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces.

Generally speaking, clients 250 may encompass any type of client that can submit network-based requests to provider network 200 via network 260, including requests for object recognition service 210 (e.g., a request to search or identify an object using an object recognition index, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of Object recognition service 210 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., access requests to read or write data may be via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
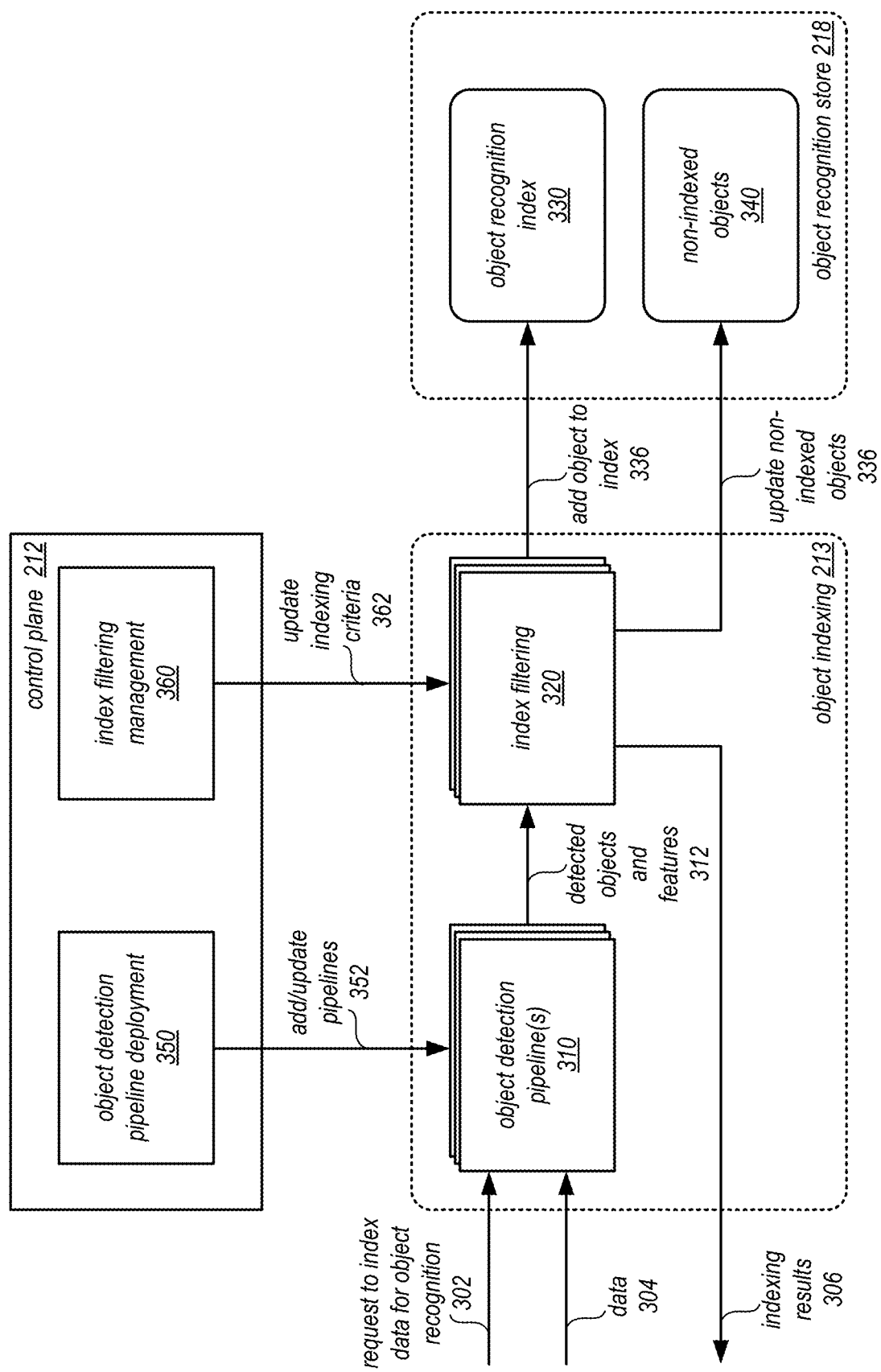
FIG. 3 illustrates a logical block diagram for indexing objects from data, according to some embodiments.

FIG. 3 illustrates a logical block diagram for indexing objects from image data, according to some embodiments. Object indexing 230 may receive a request to index image data 302. For example, the request 302 may specify an object recognition index to include for detected objects, configurations or controls on the detection technique (e.g., limits on the number/size of objects detected), a location or identifier of the image, among other parameters. In some embodiments, the request 302 may be a request to create an object recognition index which from a set of image data identified in request 302. In some embodiments, the request 302 may include a parameter to actively perform index filtering 320. If the request 302 were not to include such a parameter value (or it was set to false, off, etc.) then the index filtering may not be performed for that request 302 in some embodiments so that detected objects that would not have satisfied the index filtering criteria would still be included in the object recognition index.

Object detection pipelines 310 may retrieve (or request other components to retrieve) the specified data 304. As discussed above with regard to FIG. 1 and below with regard to FIG. 6, different object detection pipeline(s) 310 may be implemented for detecting different types of objects, in some embodiments. A face detection pipeline may be different than a text detection pipeline, in some embodiments. Various natural language processing techniques may be implemented as object detection pipelines 310, such as pipelines implemented to perform different analysis or actions, including various syntax, semantics, discourse, and speech analysis. The request to index 302 may specify which pipeline, in some embodiments. Object detection pipeline(s) 310 may apply object detection techniques (e.g., utilizing various techniques discussed above with regard to FIG. 1 such as those that utilize deep neural networks) to detect objects and extract features 312 which may be provided to index filtering 320.

Index filtering 320 may apply a filter corresponding to the type of object detection pipeline (e.g., a face filter for a face detection pipeline, a text detection filter for a text detection filter pipeline, and so on), in some embodiments. As noted earlier, in some embodiments, indexing criteria may not be linearly applied but may be weighted in different combinations. For example, for face detection pipelines alternative sets of criteria may be satisfied so that satisfying one of the criteria sets may allow the detected face to be included. For example, one criteria set may be satisfied by exceeding a minimum threshold of sharpness (e.g., 95%) and confidence (e.g., 95%), or a second criteria set may be satisfied by a pose with a pitch value, yaw value, and roll value within certain ranges, exceeding a minimum brightness value, exceeding a minimum sharpness value (e.g., which may be different than the other criteria set, such as >=40%), exceeding a minimum confidence value (e.g., which may be different than the other criteria set, such as >=80%), and a bounding box height and width greater than minimum values. In some embodiments, indexing filtering criteria could be staged so that a first pass filter may identify objects to definitively include (or exclude) whereas later stage indexing criteria could include performing further analysis of the detected object.

For those detected objects that satisfy the filter, an object may be added 336 to object recognition index 330. For example, a feature vector other representation of the object may be stored in object recognition store 218 (e.g., as a bit vector or single data value or alternatively each field may be indexed to a feature value in an array, field values in a database entry, or other data structure). For those detected objects that do not satisfy the filter, an update to a list, structure, or other set of non-indexed objects 340 (which may be persistently maintained or periodically purged or trimmed). The update may include the features (e.g., the feature vector) generated for the excluded object so that, as discussed below with regard to FIG. 4, the excluded objects can be returned responsive to interface requests along with one or more of the extracted feature values, in some embodiments. Indexing results 306 may be returned which may include an indication of successful and/or excluded detected objects and features, in some embodiments.

Control plane 212 may implement features to manage or configure the indexing of detected objects, in some embodiments. For example object detection pipeline deployment 350 allow an operator to develop, generate, or create a new object detection pipeline (or update to an existing one) and then push out the addition/update 352 to resources (e.g., nodes) that implement object detection pipelines 310. For example, software updates, or other instructions for performing an additional/updated object detection pipeline may be stored, booted, or loaded by object detection pipeline deployment so that requests may be directed to the updated or additional pipelines. In some embodiments, users of object recognition service may submit object detection pipelines to be hosted and performed for an object recognition index. In this way, users can take advantage of the service platform for handling indexing requests, storing object recognition indexes and index filtering 320 without separately implementing these features. Additionally, specialized object detection pipelines (e.g., for recognizing specific objects in specific scenarios in video files) could be deployed by object detection pipeline deployment 350 responsive to such requests. In some embodiments, the custom object detection pipelines could be limited to requests associated with identified accounts of provider network 200 or could be publicly available to any requesting application.

Control plane 212 may also implement index filtering management 360 which may update or create new 362 indexing criteria. In some embodiments, the updates may be triggered by an update to an existing object detection pipeline 310 or addition of a new object detection pipeline 352. Changes or new indexing criteria may be determined based on analysis of false and true positives detected by the updated or additional object detection pipeline, as discussed in detail below with regard to FIG. 7. For example, if a new object detection pipeline 310 is added then index filtering 310 may be updated to include a filter 320 specific to the object detection pipeline 310, or threshold values for an existing filter may be modified, in some embodiments. Indexing filtering criteria may be stored in a data store (not illustrated) so that when a detect object is received from an object detection pipeline, the index filtering criteria for that pipeline may be retrieved an applied. Updates, therefore, may be made to the criteria in the data store, in some embodiments.

Figure 4:
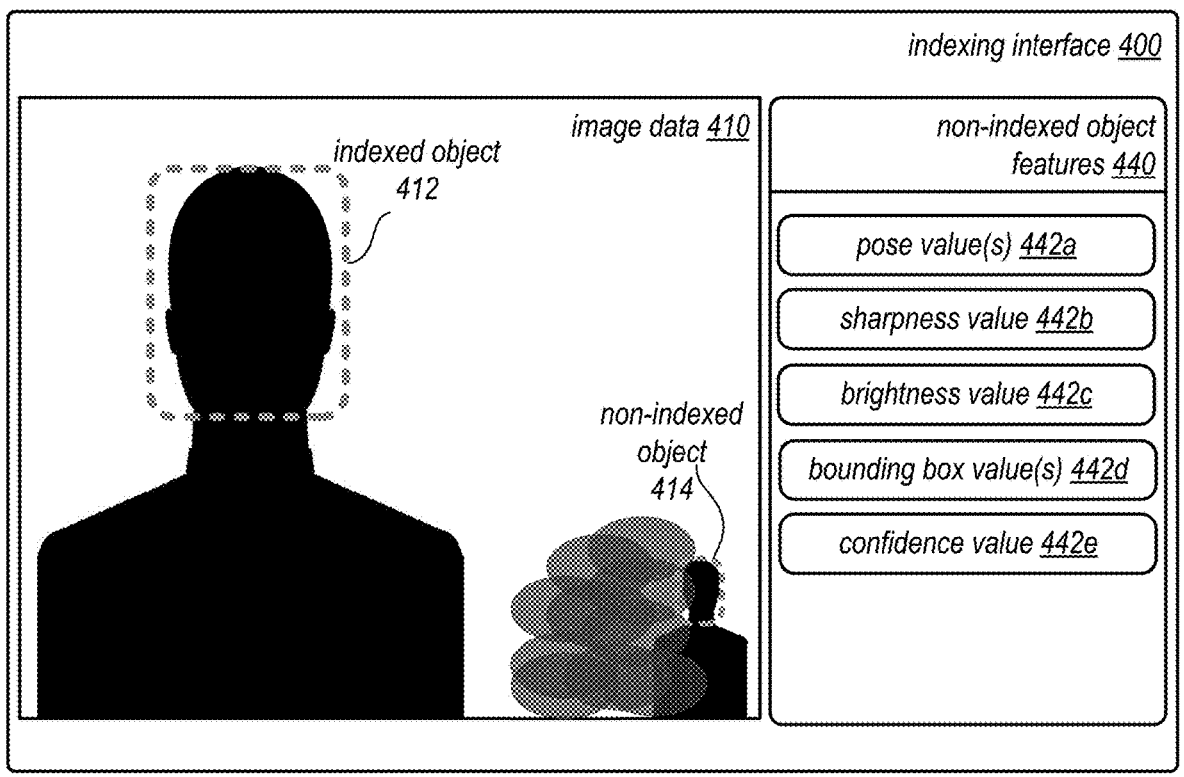
FIG. 4 illustrates an example interface for displaying indexing results, according to some embodiments.

FIG. 4 illustrates an example interface for displaying indexing results, according to some embodiments. A graphical user interface, such as indexing interface 400 may be implemented as part of interface 211 of object recognition service 201, in some embodiments. Indexing interface 400 may provide a display area for image data, such as image data 400 that may be evaluated or considered for object detection and inclusion in an object recognition index. Overlaid upon image data 410 may be indications of detected objects and such indications may include whether the object was (or was not) included in the object recognition index, such as indexed object indication 412 and non-indexed object 414. For example, a bounding box may be displayed around detected objects. If the bounding box is selected via an I/O action (e.g., a mouse click, a touch gesture, etc.), then the features of the detected object may be displayed.

For example, non-indexed object feature(s) 440 may include a display area for features of the non-indexed object in order to provide insight into the values that could have prevented inclusion of the object 414. For example, feature values for a detected face object 414 (and unsatisfied thresholds, in some cases) could be displayed, like pose value(s) 442a (which may describe the rotation of the face inside the image data), sharpness value 442b, brightness value 442c, bounding box value(s) 442d (which may describe coordinates of the bounding box that surrounds the face in the image data from which bounding box size can be determined) and confidence value 442e (which may describe a level of confidence that the bounding box contains a face), in some embodiments. An indication of the failed threshold or indexing criteria could be provided, in some embodiments. For example, extracted features 442 that failed or contributed to the failure of the object to the index could be highlighted.

Please note that although FIG. 4 is discussed in the context of a graphical user interface, various features for indicated indexed and non-index objects could be implemented for other interfaces (e.g., APIs or command line interfaces). For example, a request may be received via an API to return excluded or otherwise unindexed objects detected in image data submitted for inclusion for an object recognition index, in some embodiments.

The object recognition index created according to the techniques described above can be used in different analyses. FIG. 5 illustrates a logical block diagram of object recognition using an object recognition index, according to some embodiments. Object search 510 may be implemented in some embodiments using an object recognition index, like object recognition index 540. Object search 510 may take as an input to object analysis request 502, like a query image for searching stored image data to see if the image is found or a query text/character string that matches one written by a same writer. For example, a video file catalog could be searched for a particular actor according to query image of the actors face, in some embodiments.

Object comparison 520 may be implemented, in some embodiments, to perform analysis to compare detected objects with indexed objects. For example, facial recognition could be implemented by comparing a live face image captured in streaming video data with an index face object to determine the identity and thus the permissions of the person whose face is being captured in the live image data. A feature vector may be generated for the live face image using a CNN or other feature extraction technique that is the same as was applied to generate object recognition index 540, in some embodiments.

Object content analysis 530 could be used to search stored image data according to content, such as text, types of objects according to appearance (e.g., red apples), or restricted content (e.g., adult content). For example, the feature vector generated for the query object may be compared with the feature vectors of objects in the object recognition index 540. If the distance between the feature vectors is less than a threshold, then the object in the index may be included in a result 504.

Object analysis request 502 may indicate which analysis to perform, as well as the object recognition index 540 to use. In this way, object recognition 215 can get or update object attributes 542 back 544 from object recognition index, in some embodiments. A result 504 of the object analysis may then be returned (e.g., locations of video files with identified actor, an indication of a user match, an indication or label for the content, like "red apple."

Although FIGS. 2-5 have been described and illustrated in the context of a provider network implementing an object recognition service, the various components illustrated and described in FIGS. 2-5 may be easily applied to other object recognition systems that utilize an object recognition index to perform various types of object analyses. As such, FIGS. 2-5 are not intended to be limiting as to other embodiments of filtering detected objects from an object recognition index according to extracted features.

Figure 6:
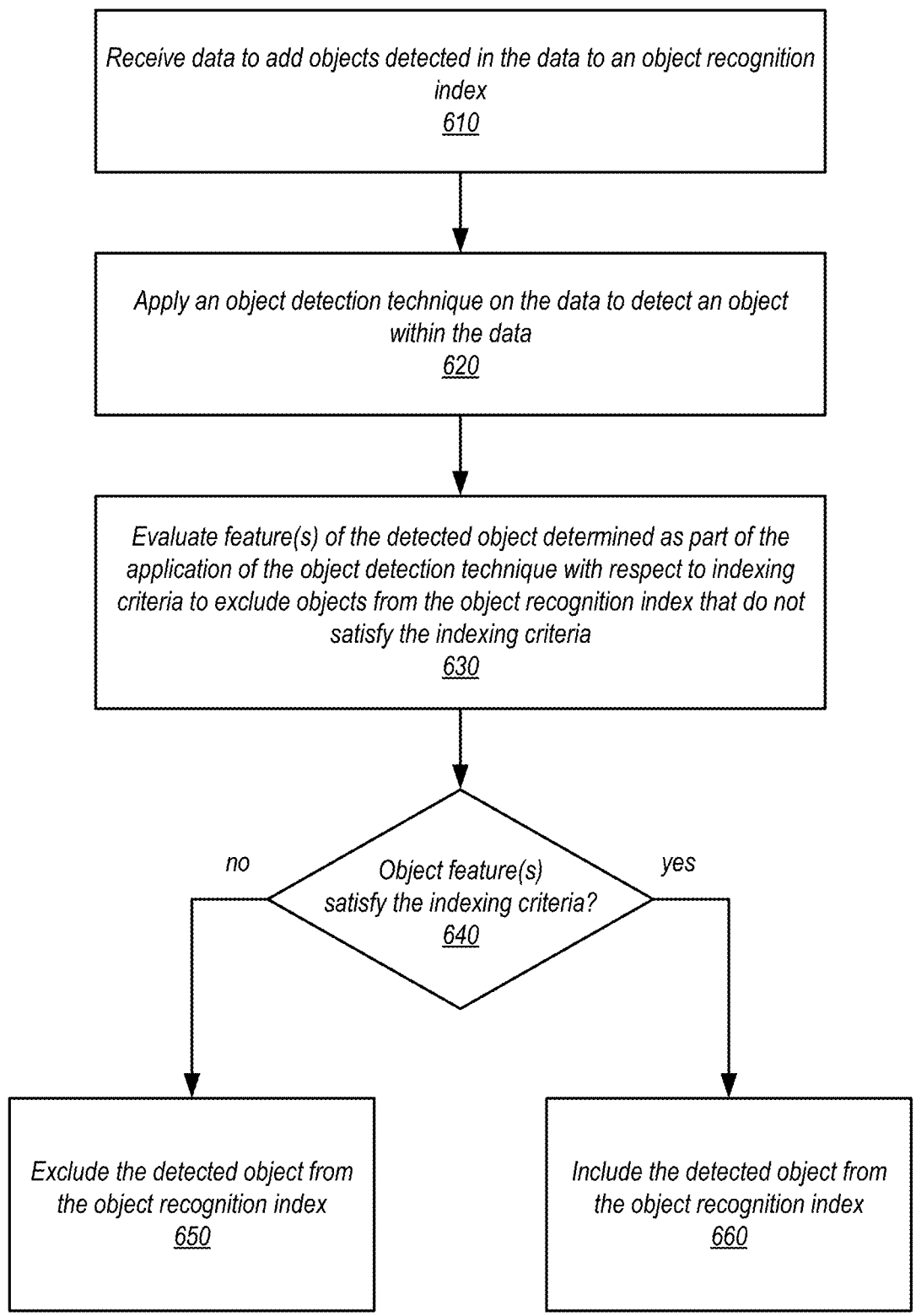
FIG. 6 illustrates a high-level flowchart of various methods and techniques to implement filtering detected objects from an object recognition index according to extracted features, according to some embodiments.

FIG. 6 illustrates a high-level flowchart of various methods and techniques to implement filtering detected objects from an object recognition index according to extracted features, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

As indicated at 610, data to add objects detected in the data to an object recognition index may be received, in some embodiments. For example, the data may be retrieved from an identified storage location, or may be streamed, sent, or transferred to an object detection system as part of or alongside a request to index objects detected within the data, such as the requests discussed above with regard to FIG. 3. The object recognition index may be identified according to an identifier or other indicator, in some embodiments. In this way, different object recognition indexes built from different image data and utilized for different analyses can be maintained.

As indicated at 620, an object detection technique may be applied on the data to detect an object within the data, in some embodiments. Different techniques may be performed to crop, enhance, down-sample, normalize, or otherwise modify data for object detection, in some embodiments. For example, gamma correction may be applied to enhance image data quality for face detection. Different object detection techniques may be applied for different types of data and analyses. For instance, a histogram of oriented gradients (HOG) determined for an image may be evaluated utilizing a trained support vector machine (SVM) to detect faces in an area of image data identified within a bounding box. Similarly, other object detection techniques may be applied, such as rule-based object detection, structural feature detection, template matching, neural networks, sparse network of winnows, naïve bayes classifiers, hidden markov models, or inductive learning-based detection techniques may be performed to detect objects.

For detected objects, various features within the data that corresponds to detected objects may be extracted. For instance, the image data within a bounding box or other boundary for the detected object may be then be analyzed according to a feature extraction technique, like a CNN. The feature extraction technique may identify features of the detected object so that if included in the object recognition index, the detected object could be analyzed for a match, in some embodiments. Extracted features may be encoded (e.g., as a feature vector), in various embodiments, which may be used to represent a detected object.

As indicated at 630, the features of the detected object determined as part of the application of the object detection technique may be evaluated with respect to one or more indexing criteria to exclude objects from the object recognition index that do not satisfy the indexing criteria, in some embodiments. For example, various combinations of thresholds, ranges, confidence scores, Boolean values, or other features extracted along with the detected object may be compared. In some embodiments, a single composite or weighted score may be generated, while in other embodiments, individual evaluations for individual criterion of the indexing filter criteria may be performed. In some circumstances all indexing criteria may be need to be satisfied, whereas in other embodiments, alternative criteria can be satisfied.

As indicated by the positive exit from 640, a detected object that satisfies the indexing criteria may be included in the object recognition index, as indicated at 660, in some embodiments. A feature vector or other representation of the detected object may be stored in a data store, structure, or other location that can be analyzed when performing an analysis on detected objects in the object recognition index. As indicated by the positive exit from 640, a detected object that does not satisfy the indexing criteria may be excluded in the object recognition index, as indicated at 650, in some embodiments. A response indicating an error, or a detected false positive object or low quality object may be sent (e.g. via an API, graphical interface, etc.). In some embodiments, the response may indicate the values of the extracted features for the objects and/or the indexing criteria that the object failed to satisfy.

Figure 7:
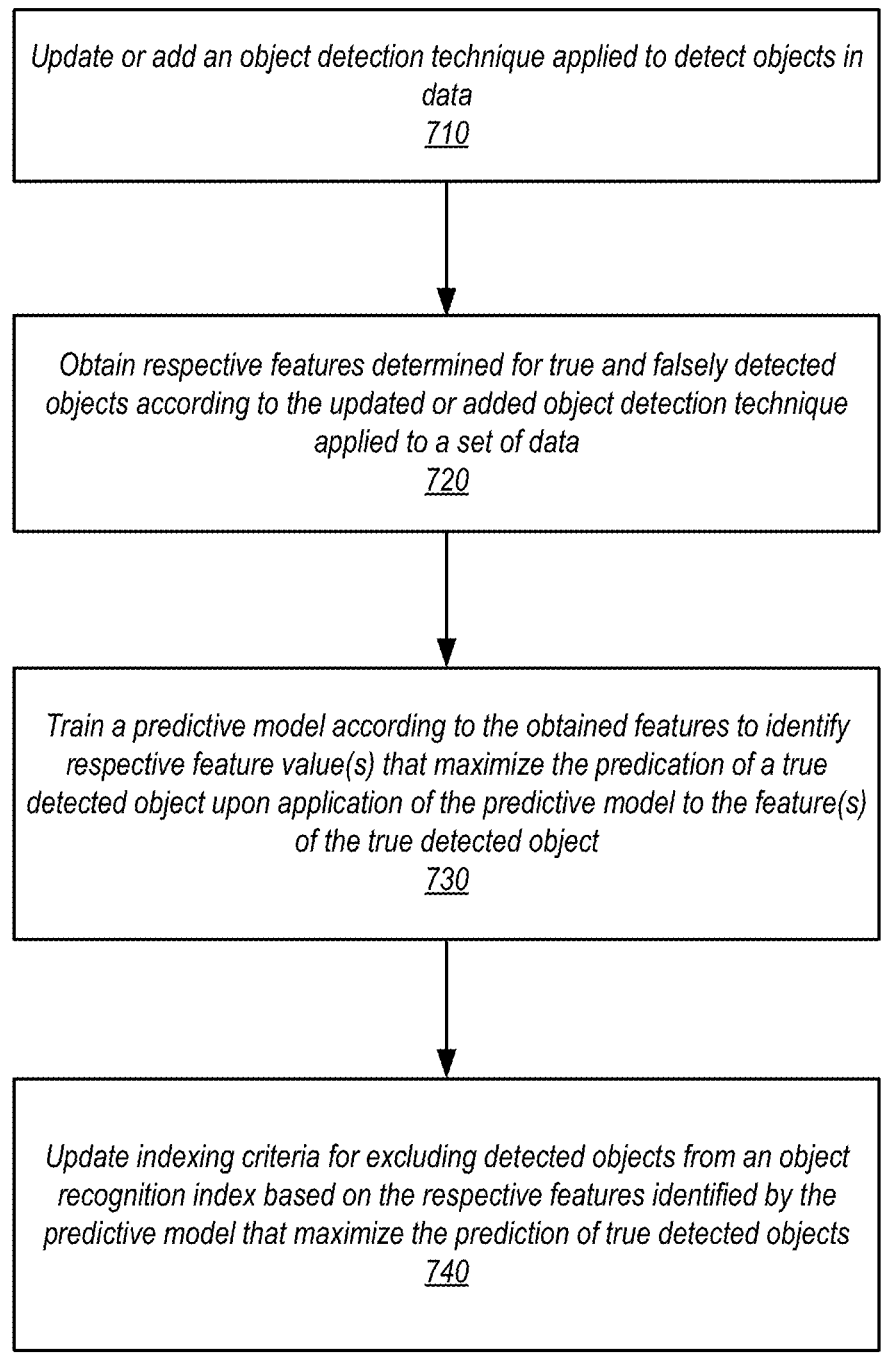
FIG. 7 illustrates a high-level flowchart of various methods and techniques to implement determining indexing criteria to filter detected objects, according to some embodiments.

FIG. 7 illustrates a high-level flowchart of various methods and techniques to implement determining indexing criteria to filter detected objects, according to some embodiments. As indicated at 710, an update to or addition of an object detection technique applied to detect objects in data may be performed, in some embodiments. For example, one or more convolution or down-sampling layers of a neural network used to detect objects may be adjusted or replaced to improve detection performance. In some embodiments, an update to the object detection technique may include a change to pre-processing or other formatting performed upon data prior to evaluating the data through the deep neural network. An addition of a new object detection technique may be trained to detect a type of object, such as human faces, animals, text, vehicles, among other examples that was not previously supported in an object detection or recognition system, like object recognition service 210 in FIG. 2.

As indicated at 720, respective features determined for true and falsely detected objects according to the updated or added object detection technique applied to a set of data may be obtained, in some embodiments. For example, a labeled set of objects (e.g., true positive object detections and false positive object detections) may be received for the set of image data. The updated or added technique may also be applied to the image set of data to extract feature values for the detected objects (e.g., sharpness, bounding box, confidence, etc.) at an indexing filtering management system or component, in some embodiments.

As indicated at 730, a predictive model may be trained according to the obtained features to identify one or more respective feature value(s) that maximize the prediction of a true detected object upon application of the predictive model to the feature(s) of the true detected object, in some embodiments. For example, a boosting technique, like gradient boosting, may be performed to generate a predictive model like a decision tree that identifies applies weak learners determined from individual feature values to generate one or more combined sets of feature values that are indicative of a true positive detection of an object. For example, the statistical values of the minimum, maximum, mean, standard deviation, outlier minimum and outlier maximum of different feature values for true positive object detections can be used as a starting point for determining the feature values by applying logic such as greater than the minimum and/or less than the maximum of each of the different statistical values (e.g., sharpness greater than the minimum value).

Once trained, the predictive model may be used to identify updates (if any) to the indexing criteria. As indicated at 740, indexing criteria for excluding detected objects from an object recognition index may be updated based on the respective features identified by the predictive model that maximize the prediction of true detected objects, in some embodiments. For instance, the minimum confidence value, sharpness value, or brightness value may be adjusted upward or downward according to the boosted decision tree.

The methods described herein may in various embodiments be implemented by any combination of hardware and software. For example, in one embodiment, the methods may be implemented on or across one or more computer systems (e.g., a computer system as in FIG. 8) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
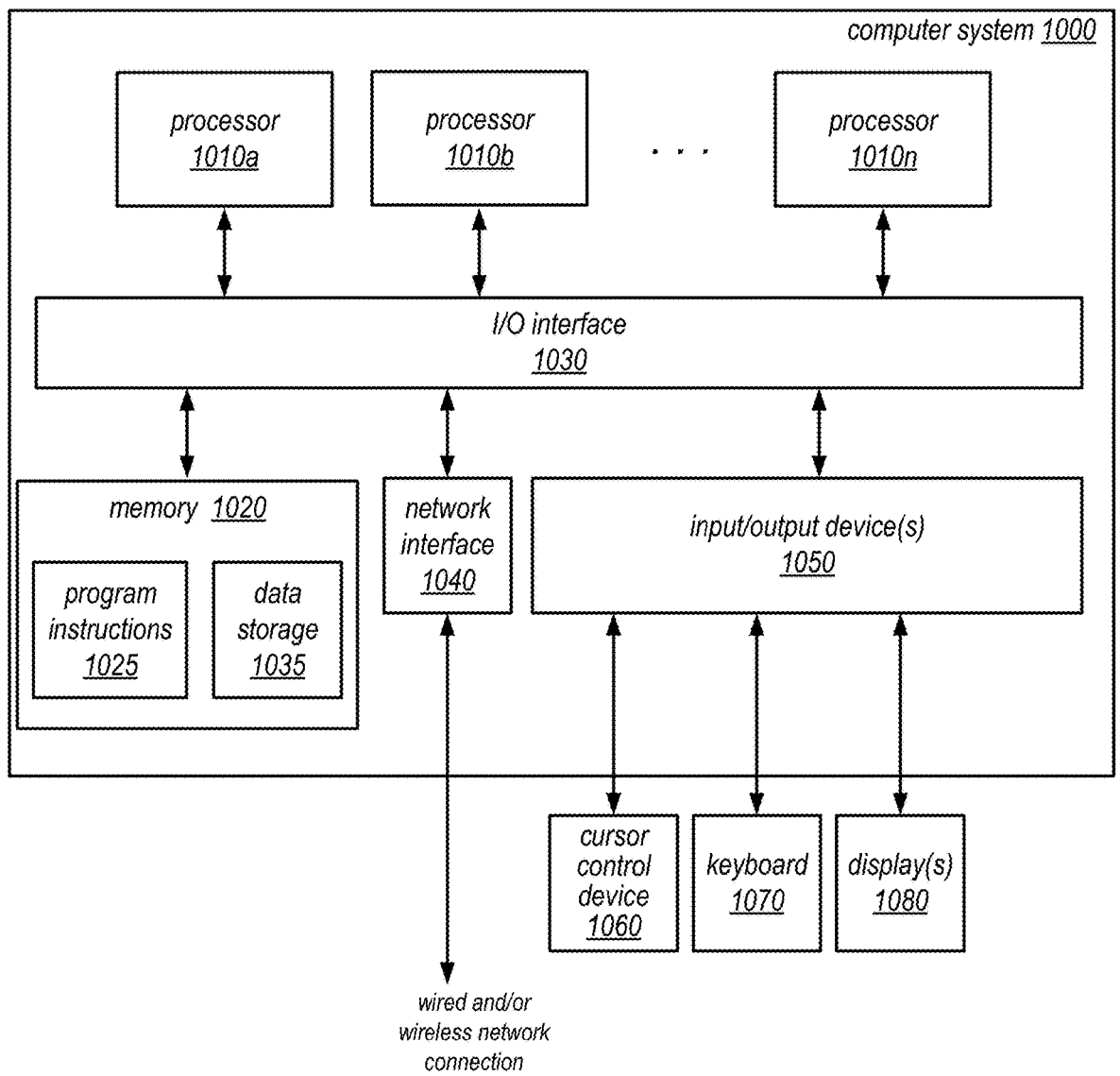
FIG. 8 illustrates an example system to implement the various methods, techniques, and systems described herein, according to some embodiments.

Embodiments of filtering detected objects from an object recognition index according to extracted features as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor cause the at least one processor to:
   receive data to add objects detected in the data to an object recognition index;
   detect an object in the data according to an object detection technique;
   extract one or more features for the detected object;
   evaluate the one or more features of the detected object according to one or more indexing criteria to determine whether to exclude objects from the object recognition index; and
   responsive to a determination that the detected object does not satisfy the one or more indexing criteria, exclude the detected object from being stored in the object recognition index to exclude the detected object from being returned in response to a request to analyze other data using the object recognition index.

2. The system of claim 1, wherein the program instructions further cause the at least one processor to return the representation of the one or more features of the detected object responsive to a request for objects not included in the object recognition index.

3. The system of claim 1, wherein to extract the one or more features for the detected object, the program instructions cause the at least one processor to:
   apply a convolutional neural network trained to indicate similarity between detected objects to the detected object in order to determine a feature vector that represents the one or more features of the detected object; or
   apply the convolutional neural network to determine one or more intermediate features in order to determine the one or more features as domain specific attributes of the detected object.

4. The system of claim 1, wherein the at least one processor and the memory are implemented as part of an object recognition service of a provider network that detects human faces in images, wherein the data is image data, wherein the object recognition index is hosted in the provider network, and wherein the detection, evaluation, extraction, and exclusion are performed responsive to a request to index the image data as part of the object recognition index.

5. A method, comprising:
   applying, by one or more computing devices, an object detection technique on data to detect an object within the data to be considered for inclusion in an object recognition index;
   evaluating, by the one or more computing devices, one or more features of the detected object determined as part of the application of the object detection technique with respect to one or more indexing criteria to exclude objects from the object recognition index that do not satisfy the one or more indexing criteria; and
   excluding, according to a determination that the one or more features of the object do not satisfy the one or more indexing criteria, by the one or more computing devices, the detected object from being stored in the object recognition index to exclude the detected object from being returned in response to a request to analyze other data using the object recognition index.

6. The method of claim 5, further comprising receiving, by the one or more computing devices, a request to index objects within the data, the applying, the evaluating, and the excluding are performed responsive to the request.

7. The method of claim 6, further comprising:
   responsive to the request, obtaining the data from a data store indicated by the request.

8. The method of claim 6, wherein the request includes a parameter that requests application of the one or more indexing criteria when considering objects detected in the data for inclusion in the object recognition index.

9. The method of claim 5, further comprising:
   wherein the applying of the object detection technique on the data detects a second object within the data;
   evaluating, by the one or more computing devices, one or more features of the second detected object determined as part of the application of the object detection technique with respect to the one or more indexing criteria; and
   including, by the one or more computing devices, the second detected object in the object recognition index according to a determination that the one or more features of the second detected object satisfy the one or more indexing criteria.

10. The method of claim 5, further comprising:
    after an update to the object detection technique:
    obtaining, by the one or more computing devices, respective features for true and falsely detected objects according to the updated object detection technique applied to a plurality of data;
    training, by the one or more computing devices, a predictive model according to the obtained features to identify respective feature values that maximize a prediction of one of the true detected objects upon application of the predictive model to the respective features of the one true detected object; and
    updating, by the one or more computing devices, the one or more indexing criteria based on the respective features identified by the predictive model that maximize the prediction of true detected objects.

11. The method of claim 5, further comprising returning, by the one or more computing devices, a response via an interface indicating that the object was not included in the object recognition index and an indication of at least one of the respective features of the object that failed to satisfy the one or more indexing criteria.

12. The method of claim 5, wherein the object detection technique is a natural language processing technique.

13. The method of claim 5, further comprising:
applying, by the one or more computing devices, a second object detection technique on second data to detect an object within the second data to be considered for inclusion in an second object recognition index;
evaluating, by the one or more computing devices, one or more features of the detected object determined as part of the application of the second object detection technique with respect to one or more other indexing criteria to exclude objects from the second object recognition index that do not satisfy the one or more indexing criteria, wherein the one or more other indexing criteria are different than the one or more indexing criteria; and
excluding, by the one or more computing devices, the detected object from the second object recognition index according to a determination that the one or more features of the object do not satisfy the one or more other indexing criteria.

14. One or more non-transitory, computer-readable storage media, storing program instructions that when executed on or across one or more computing devices cause the one or more computing devices to implement:
receiving image data to add objects detected in the image data to an object recognition index;
applying an object detection technique on the image data to detect an object within the image data;
evaluating one or more features of the detected object determined as part of the application of the object detection technique with respect to one or more indexing criteria to exclude objects from the object recognition index that do not satisfy the one or more indexing criteria; and
excluding, according to a determination that the one or more features of the object do not satisfy the one or more indexing criteria, the detected object from being stored in the object recognition index to exclude the detected object from being returned in response to a request to analyze other data using the object recognition index.

15. The one or more non-transitory, computer-readable storage media of claim 14, wherein the program instructions cause the one or more computing devices to further implement:
wherein the applying of the object detection technique on the image data detects a second object within the image data;
evaluating, by the one or more computing devices, one or more features of the second detected object determined as part of the application of the object detection technique with respect to the one or more indexing criteria; and
including, by the one or more computing devices, the second detected object in the object recognition index according to a determination that the one or more features of the second detected object satisfy the one or more indexing criteria.

16. The one or more non-transitory, computer-readable storage media of claim 14, wherein the applying of the object detection technique on the image data includes application of a convolutional neural network trained to indicate similarity between detected objects to the detected object in order to determine a feature vector that represents the one or more features of the detected object.

17. The one or more non-transitory, computer-readable storage media of claim 14, wherein the program instructions cause the one or more computing devices to further implement:
after an addition of a second object detection technique that can be performed by the one or more computing devices:
obtaining, respective features for true and falsely detected objects according to the added object detection technique applied to a plurality of image data;
training a predictive model according to the obtained features to identify respective feature values that maximize a prediction of one of the true detected objects upon application of the predictive model to the respective features of the one true detected object; and
adding one or more indexing criteria for the added object detection technique based on the respective features identified by the predictive model that maximize the prediction of true detected objects.

18. The one or more non-transitory, computer-readable storage media of claim 14, wherein the program instructions cause the one or more computing devices to further implement:
receiving a request to index a second image data for inclusion in the object recognition index, wherein the request includes a parameter that disables application of the one or more indexing criteria when considering objects detected in the image data for inclusion in the object recognition index;
applying the object detection technique on the second image data to detect an object within the second image data; and
including the object detected in the second image data in the object recognition index.

19. The one or more non-transitory, computer-readable storage media of claim 14, wherein the program instructions cause the one or more computing devices to further implement:
storing a representation of the one or more features of the detected object; and
returning the representation of the one or more features of the detected object responsive to a request for objects not included in the object recognition index.

20. The one or more non-transitory, computer-readable storage media of claim 14, wherein the one or more computing devices are implemented as part of an object recognition service of a provider network, wherein the object recognition index is hosted in the provider network, and wherein the detection, evaluation, extraction, and exclusion are performed responsive to a request to index the image data as part of the object recognition index.

* * * * *